Aug. 30, 1966  K. REINIGER  3,269,673
FLYING CRAFT, PARTICULARLY SPACE CRAFT
Filed Jan. 28, 1964  5 Sheets-Sheet 1
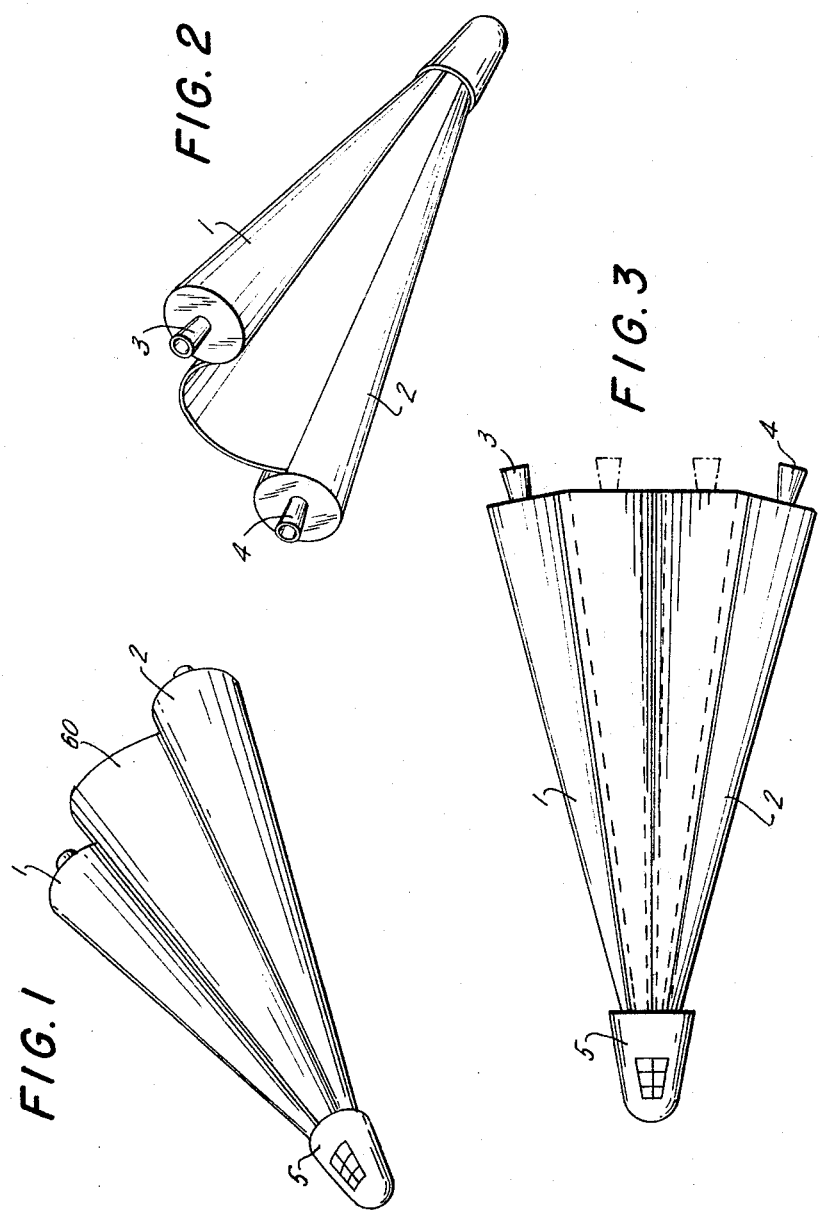
INVENTOR.
Kurt Reiniger
BY Michael J. Striker

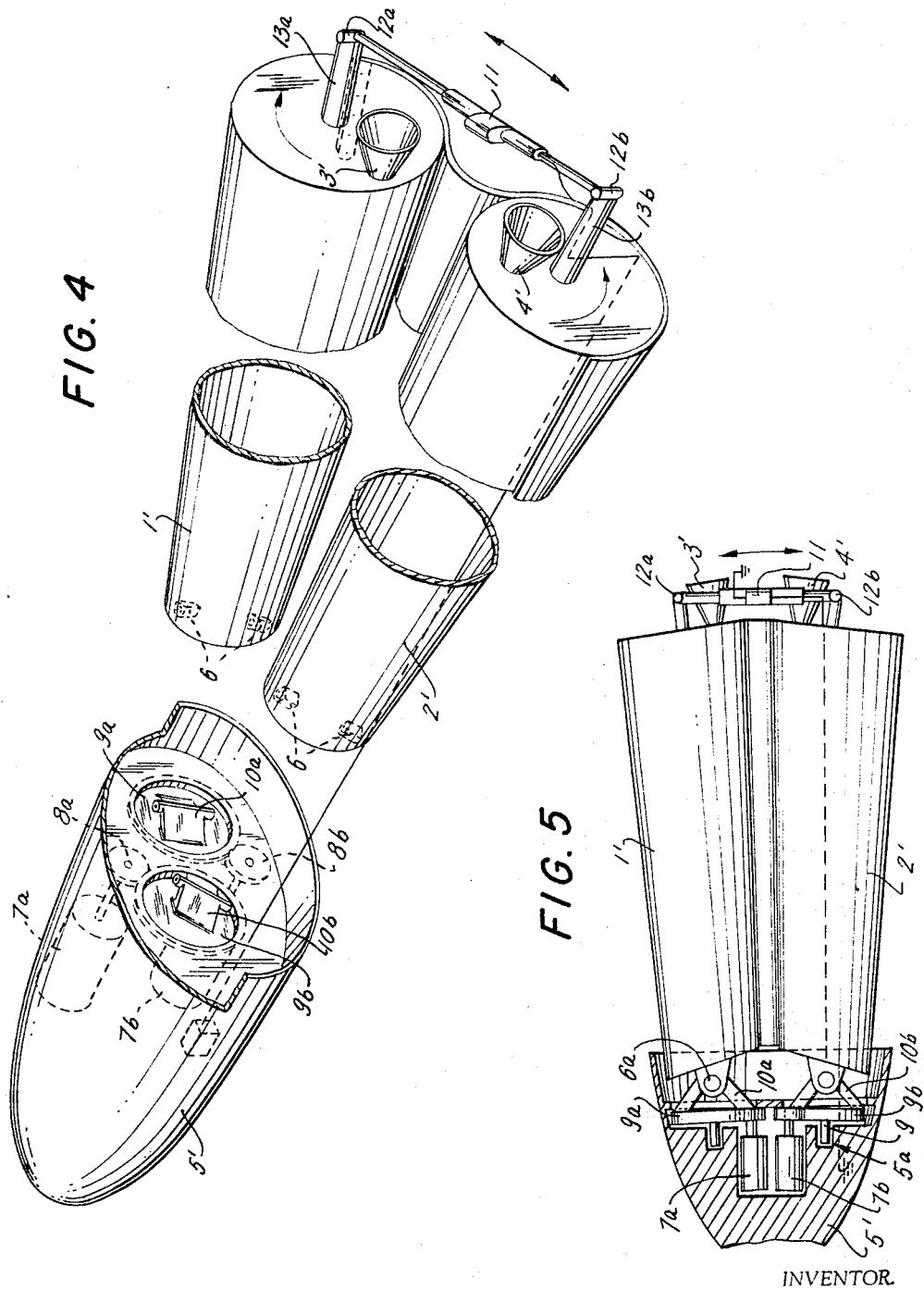

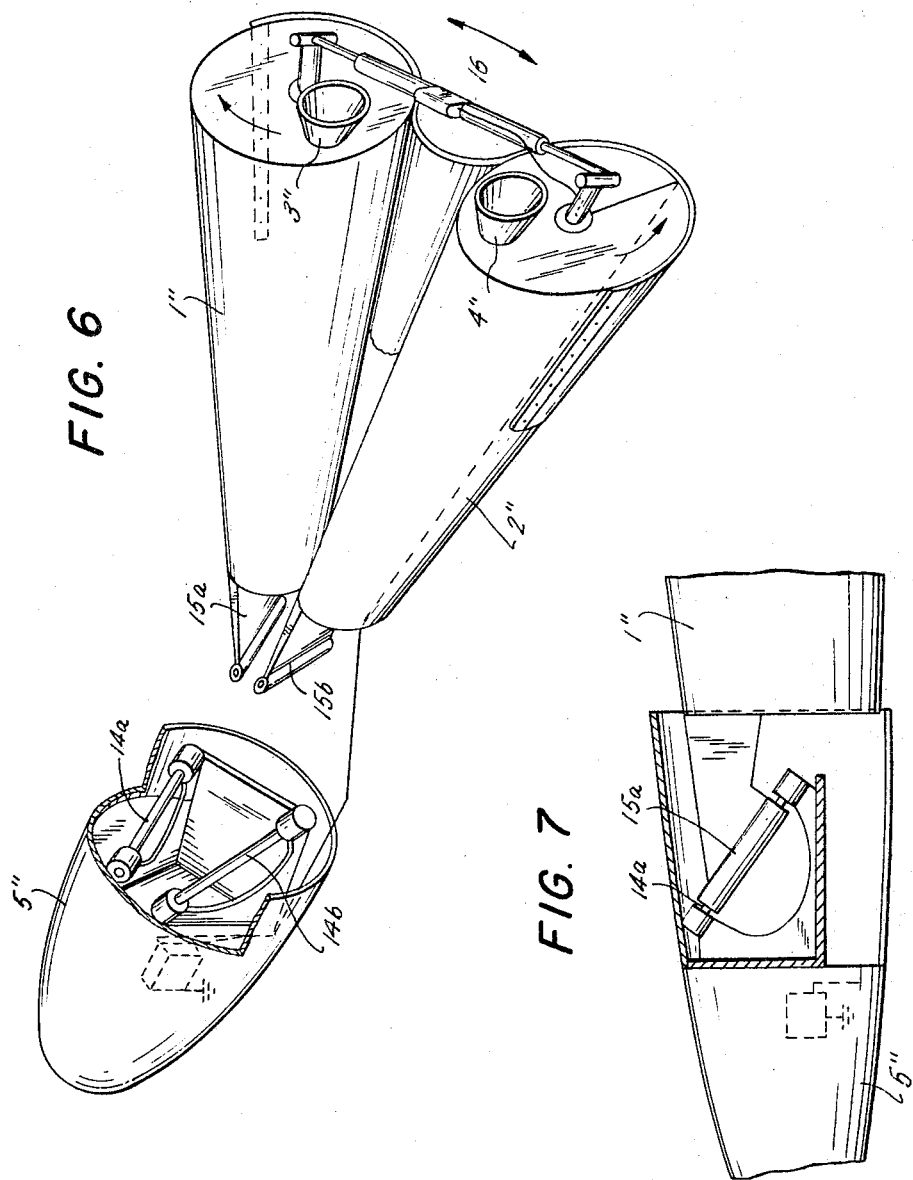

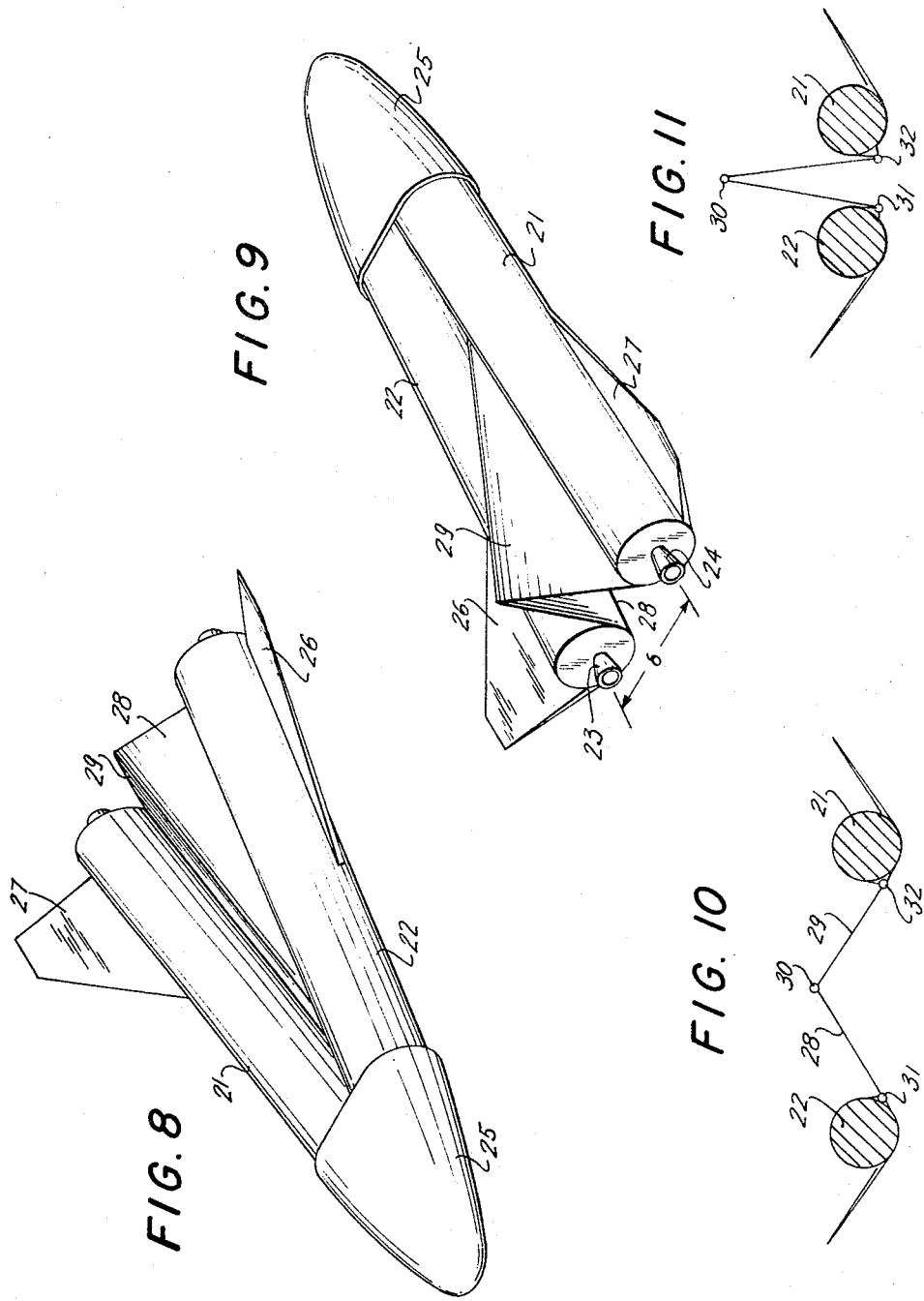

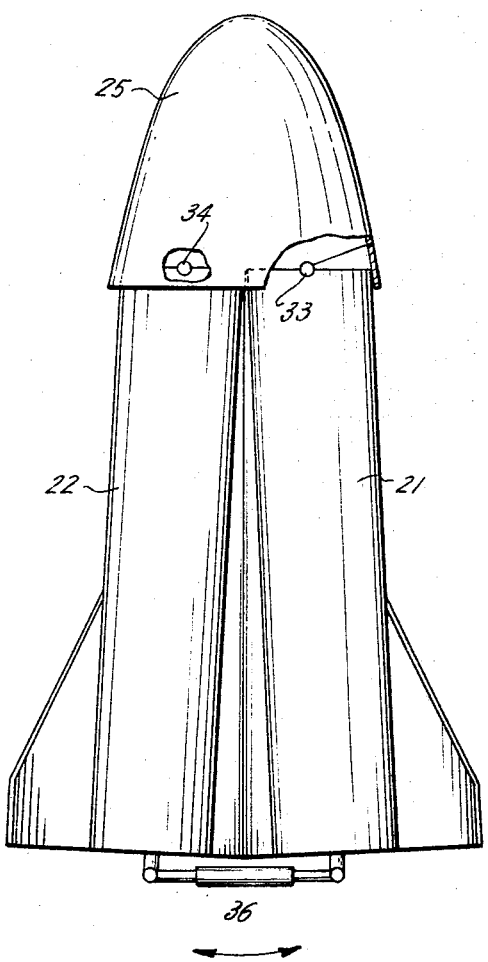

United States Patent Office 3,269,673
Patented August 30, 1966

3,269,673
FLYING CRAFT, PARTICULARLY SPACE CRAFT
Kurt Reiniger, Grobenzell, Germany, assignor to Junkers Flugzeug- und Motorenwerke Aktiengesellschaft, Munich, Germany
Filed Jan. 28, 1964, Ser. No. 340,755
Claims priority, application Germany, Jan. 29, 1963, J 23,067; Jan. 30, 1963, J 23,083
20 Claims. (Cl. 244—43)

The present invention relates to a flying craft, and more particularly to a spacecraft designed for the purpose of returning from outer space to the earth surface after having passed through the atmosphere.

Aircraft is known which have retractable rigid wings which are advanced only after re-entry into the atmosphere so that the aircraft passes through the atmosphere in the manner of a glider and lands with the aid of the wings. It has also been proposed to provide a spacecraft with a sail which is ejected from the craft before the re-entry into the atmosphere to support the craft in the manner of a kite.

The known solutions of the problem of re-entry into the atmosphere with the aid of supporting air foils are not fully satisfactory.

It is the principal object of the present invention to provide a flying aircraft, particularly a spacecraft, which will pass through the atmosphere at a reduced speed supported by the air and gliding in the same.

Another object of the present invention is to provide a spacecraft in which the load per surface unit is reduced and the drag lift ratio improved while the craft passes through the atmosphere.

Another object of the invention is to provide a spacecraft with a wing whose effective surface can be varied in accordance with prevailing conditions, but which need not be retracted into the body of the aircraft.

Another object of the invention is to attach a wing to a spacecraft in such a manner that the forces acting on the wing will not produce bending moments on the body of the aircraft.

Another object of the invention is to provide an aircraft with a wing which is arranged and constructed in such a manner that the forces acting on the wing are transmitted to the wall of the body of the craft in a tangential direction.

With these objects in view, the present invention relates to a flying craft, particularly to a spacecraft, which comprises two bodies, and a wing between the bodies secured to the same. In the preferred embodiment of the invention, the two bodies are angularly spaced hollow shells and the forward ends of the bodies are connected to each other for angular movement between a closer spaced position and a farther spaced position.

The wing has lateral edges secured to the two bodies, and is either flexible or foldable, so that when the angle between the two bodies of the craft is reduced, the center portion of the wing rises, either forming a curved surface convex on top and concave on the bottom, or a central fold line.

Forwardly of the two bodies and of the wing, a capsule is disposed on which the mounting means for the bodies are supported. Preferably, the rear ends of the two bodies are connected by telescoping means driven by a hydraulic motor by which the angular space between the two bodies, and thereby the position of the wing can be adjusted.

When the bodies are rotated about longitudinal axes while the angular space is reduced, a wing consisting of a flexible material is rolled up on the two bodies, which are advantageously made cylindrical, preferably of circular cylindrical shape, or of a slim frusto-conical shape tapering in forward direction.

In the embodiment of the invention in which the wing is a flexible membrane, the wing will assume a shape corresponding to the tensile forces acting thereon, and consequently no bending moments are transmitted to the lateral bodies. In the embodiment in which a foldable wing consisting of rigid panels is used, it is preferred to provide joints along the lines where the lateral edges of the wing are attached to the bodies, and also along the fold lines of the wing where edges of the panels are located adjacent each other. The joints along the bodies transfer tensile forces acting on the wing in a tangential direction to the preferably circular peripheral outlines of the bodies.

Due to this construction, the forces transmitted from the wing to the bodies act as tensile forces on the walls of the bodies, so that the same can be constructed to weigh less than fuselages on which rigid wings are fixedly anchored.

The construction of the invention permits an adaptation of the specific load on the surface of the craft, and of the drag lift ratio of the wing to the prevailing flight conditions by varying the angular spacing between the two bodies which is accomplished by turning the same about axes perpendicular to the longitudinal axes of the bodies of the craft.

When the angle between the two bodies is reduced, the flexible wing will abut the bodies and lie in curved condition on the surface of the walls of the bodies so that the forces transmitted from the wing to the bodies continue to act in tangential direction on the walls. At the same time, the central portion of the flexible wing will curve about a smaller radius of curvature and rise above the bodies. In order to prevent this effect which is undesirable from aerodynamic point of view, it is preferred to rotate the bodies along the longitudinal axes thereof so that the flexible membrane is wound up on both bodies when the same are moved toward each other.

In one embodiment of the invention, the bodies are rotated by motors for this purpose, but in another embodiment the bodies are mounted on slanted shafts so that they turn about longitudinal axes a certain angle while moving toward or away from each other.

Such a composite movement will cause an upward movement of the bodies in relation to the oblique shafts if the angle between the bodies is reduced. However, for all practical purposes the flight position is not changed due to aerodynamic counterforces, and if necessary steering maneuvers can be carried out which will result in placing the craft in the normal flight position after a variation of the relative angular position of the two bodies.

In the embodiment of the invention in which the wing is fairly rigid and folded about a central fold line, the panels of the wing form a small acute angle which improves the course stability during flight at very high speeds. When the craft flies at lower speed, the angle between the bodies is increased, and the aerodynamic effective surface of the wing more or less increased in accordance with the flight conditions.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a schematic perspective top view of a spacecraft according to the present invention;

FIG. 2 is a fragmentary perspective bottom view of the spacecraft;

FIG. 3 is a top plan view of the spacecraft;

FIG. 4 is an exploded perspective view illustrating a spacecraft according to one embodiment of the invention;

FIG. 5 is a schematic plan view on a smaller scale illustrating the embodiment of FIG. 4;

FIG. 6 is an exploded perspective view of a spacecraft according to another embodiment of the invention;

FIG. 7 is a fragmentary side view, partly in section illustrating a detail of the embodiment of FIG. 6;

FIG. 8 is a perspective top view illustrating another embodiment of the invention;

FIG. 9 is a perspective top view illustrating the embodiment of FIG. 8 in another operational position;

FIG. 10 is a schematic cross-sectional view of the craft in the position of FIG. 8;

FIG. 11 is a fragmentary schematic cross-sectional view of the craft taken in the position of FIG. 9; and FIG. 12 is a plan view of the embodiment of FIGS. 8 and 9 on an enlarged scale.

Referring now to the drawings, and more particularly to FIGS. 1 to 3, a spacecraft according to the invention has two forwardly tapering preferably frusto-conical bodies 1 and 2 which are hollow shells connected by a flexible wing, airfoil, or sail 60 whose lateral edge portions are secured to bodies 1 and 2 along the length thereof. A capsule 5 is provided at the forward ends of bodies 1 and 2 and may contain a cockpit, while the bodies 1 and 2 are mainly taken up by fuel tanks. At the hollow rear ends of bodies 1 and 2, thrust nozzles 3 and 4 are provided by which the craft is propelled. In the embodiment of FIGS. 1, 2 and 3, the wing is flexible and may be constructed of a woven metal fabric, or of a suitable textile fabric, such as canvas.

The lateral edges of the flexible wing 60 are inclined to each other and approach each other in forward direction of the craft so that the aircraft has the shape of an arrowhead. FIGS. 1, 2 and 3 illustrate the craft in the position in which the bodies 1 and 2 are farthest spaced, but the bodies 1 and 2 can be moved angularly about vertical axes in the region of their forward ends to a more closely spaced position shown in broken lines in FIG. 3.

In this manner, the longitudinal central portion of the wing will be raised and curved so that the upper surface is convex and the bottom surface is concave, the radius of curvature decreasing as the bodies 1 and 2 angularly approach each other.

When the bodies 1 and 2 are in the closely spaced position, the craft has an aerodynamic shape suitable for very high speeds, whereas in the illustrated position of the bodies and wing, a greater wing surface supports the craft so that the same can perform gliding flights at lower speed.

FIGS. 4 and 5 illustrate one embodiment of the invention in which bodies 1' and 2' are supported for angular movement about a vertical axis provided by mounting means in a capsule 5'.

Each body has at the forward end bearing means 6 arranged substantially in a vertical diametrical axis perpendicular to the longitudinal axis of the bodies.

Bearing means 6 are part of hinge means 10a and 10b which are secured to supports 9a and 9b mounted for turning movement about longitudinal axes in capsule 5'. Shafts 6a connect hinge parts 10a, 10b with hinge parts 6, and shaft portions 9 of supports 9a and 9b are located in suitable bearings 5a in the capsules.

Each support 9a and 9b is fixedly connected to a gear ring meshing with pinions 8a and 8b driven by motors 7a and 7b.

The rear ends of bodies 1' and 2' are provided with propulsion nozzles, corresponding to nozzles 3 and 4 in FIGS. 1 to 3, and have rearwardly projecting centrally located shaft portions 13a and 13b connected by pivot means 12a and 12b to the ends of a telescoping means which can be expanded and contracted by a motor 11, which preferably is a hydraulic booster motor. The connections 13a, 11, 13b increases the rigidity of the structure and accomplishes, together with the positions of the axes of the mounting means in the capsule, angular movement of bodies 1' and 2' in a single plane which is horizontal during horizontal flight.

A flexible wing 60 is secured along the longitudinal edges thereof to the frusto-conical forwardly tapering bodies 1' and 2' as explained with reference to FIGS. 1 and 2. When the craft is operated during space flights, the telescoping means 11 is in the contracted position shown in FIG. 5 so that bodies 1' and 2' are closely spaced and almost parallel. During gliding flights in the atmosphere, bodies 1' and 2' are angularly spaced from each other to define a greater angle. This movement is accomplished by the telescoping booster 11. At the same time, motors 7a and 7b are operated to rotate bodies 1' and 2' together with hinge means 10a, 10b and supports 9a and 9b so that the flexible wing is either wound up on bodies 1' and 2', or let off from the bodies. It is not necessary to fully wind up the wing so that the same is completely flattened, but an upwardly curved position as shown in FIGS. 1 and 2 may be preferred.

In the embodiment of FIGS. 6 and 7, the turning movement of bodies 1" and 2" about longitudinal axes is accomplished without special motors and gear transmissions.

The capsule 5" includes supporting means for a pair of shafts 14a and 14b which are inclined to each other in a common plane inclined to horizontal and vertical planes.

The forward ends of bodies 1" and 2" have bearing means or hinge means 15a, 15b through which shafts 14a and 14b pass. A telescoping booster or servomotor 16 is connected to the rear ends of bodies 1" and 2", as described with reference to FIGS. 4 and 5, and turns bodies 1" and 2" about shafts 14a and 14b. Due to the inclination of shafts 14a and 14b, not only the angle between bodies 1" and 2" will be increased and reduced, but the bodies will also turn about longitudinal axes whereby the edge portions of the flexible wing are wound up on the bodies, or let off from the bodies.

If the craft is to be used for a single space flight in which the wing is to be spread only once during each flight, namely before the re-entry into the atmosphere, then it is not necessary to provide mounting means permitting turning of the bodies about longitudinal axes, and it is sufficient to mount hinges 10a, 10b of the embodiment of FIGS. 4 and 5 rigidly in the capsule so that bodies are turnable about axes perpendicular to their longitudinal axes and defined by shafts 6a.

In this simplified construction, the take-off and ascent of the craft will take place with a greater load per surface unit, but this disadvantage is acceptable, because during this phase of the flight, a small drag resistance is important, but a favorable lift drag ratio is of no consequence.

A craft constructed in accordance with the present invention as described with reference to the embodiments of FIGS. 1 to 7 in which a flexible wing is provided has the following advantages:

(1) Only tensile forces, and no bending moments act on the flexible wing.

(2) The flexible wing does not transmit any longitudinal bending moments to the lateral bodies.

(3) The uniform tensile forces transmitted to the bodies act in tangential direction with respect to the substantially circular peripheral walls of the bodies which permits a light construction of the bodies.

(4) The flexible wing is light for its large surface.

(5) The wing consists of a single flexible wall so that the transmission of forces and of thermal tensions between the upper wall and the lower wall of a conventional hollow wing are avoided.

(6) The wing is so thin that an average temperature will prevail throughout the entire thickness of the wing. On the positive pressure side of the wing during operation in the atmosphere the temperature will be about 500° C. higher than on the side of negative pressure. Aside from the avoidance of thermal tensions, the maximum temperature of the membrane-like wing of the present invention will be lower than the maximum temperature of a conventional wing on the side of positive pressure.

(7) Due to the angular shape of the wing, there is no front edge as in conventional wings, and as is known to those skilled in the art, a particularly high temperature is created at the leading end of an object entering the atmosphere at high speed. It is believed that the wide angle between the bodies, together with the large radii of curvature of the same, is favorable as regards thermal stresses on the bodies.

Another embodiment of the invention is illustrated in FIGS. 8 to 12. In this embodiment, a foldable wing comprising relatively stiff panels is used.

Bodies 21 and 22 are of cylindrical shape and are provided with thrust nozzles 23 and 24 at the rear ends thereof. Horizontal rudders 26 and 27 project laterally from the outsides of bodies 21 and 22. The forward ends of the bodies are connected by mounting means on a capsule 25. The mounting means correspond generally to the construction shown in FIGS. 4 and 5, but the hinges 33, 34 are not turnable but provide axes perpendicular to the longitudinal axes of the cylindrical bodies 21 and 22.

A foldable wing includes two panels 28 and 29 of substantially triangular outline which have adjacent inner edges connected by longitudinally extending joint means 30, as best seen in FIGS. 10 and 11. The lateral outer edges of the panels are provided with joint means 31 and 32 which extend parallel to the axes of bodies 21 and 22. The remaining outermost parts of the wing are rectangular and secured along the longitudinal edges thereof to longitudinal portions of the outer surface of bodies 21 and 22. As shown in FIG. 12, a telescoping servomotor 36 is pivotally connected to shafts projecting from the rear end of bodies 21 and 22.

The angle between bodies 21 and 22 can be adjusted by operation of the telescoping servomotor 36, as explained with reference to FIGS. 4 and 5. The servomotor 36 is omitted in FIG. 9 for the sake of simplicity.

In the position of FIG. 10, the central fold line of the wing is only slightly raised, since bodies 21 and 22 are in a spread position. In this position, gliding flights in the atmosphere are carried out. In the position of FIG. 11 in which the bodies 21 and 22 are substantially parallel, the panels are steeply inclined to each other and the fold line in the center is raised so that the surface of the wing is small and the drag ratio is substantially reduced as required for flight at very high speed.

In the position of FIG. 10, panels 28 and 29 extend in tangential direction in relation to the circular walls of bodies 21 and 22, and in this position, the greatest forces are transmitted to the walls of bodies 21 and 22 while creating only tensile forces in the same.

In the position of FIG. 11, smaller forces are transmitted and therefore it is not necessary to position the panels exactly in tangential direction with respect to the walls of the bodies, but the joints 31 and 32 are positioned in such a manner that forces are transmitted in substantially tangential direction. Joints 31 and 32 are disposed slightly inwardly spaced from bodies 21 and 22 to permit the angular displacement of panels 28 and 29.

The embodiment described with reference to FIGS. 8 to 12 has very good stability in relation to all three main axes and has the following technical advantages:

(1) The wing does not transmit any substantial bending moments to the walls of the bodies.

(2) The tensile forces are transmitted in tangential direction to the circular walls of the bodies which results in a lighter construction.

(3) The wing has a lower weight than a rigid wing having a free end and rigidly mounted projecting from a fuselage.

It will be understood that each of the elements described above or two or more together, may also find a useful application in other types of flying crafts differing from the types described above.

While the invention has been illustrated and described as embodied in a spacecraft having two angularly spaced bodies and a wing connecting the bodies, it is not intended to be limited to the details shown, since various modifications and structural changes may be made without departing in any way from the spirit of the present invention.

Without further analysis of the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A flying craft having the shape of an arrowhead, and comprising two elongated body shells, capsule means including a cockpit and arranged in the region of the front ends of said body shells; mounting means for mounting the front ends of said two body shells for angular turning movement toward and away from each other; a wing located between said body shells and having lateral edge portions defining an angle with each other and being respectively secured to said body shells, said wing being constructed and arranged to permit angular movement of said body shells toward and away from each other; and propulsion means in the region of the respective rear ends of said body shells for propelling said craft in a selected path.

2. A flying craft having the shape of an arrowhead, and comprising two elongated body shells, capsule means including a cockpit and arranged in the region of the front ends of said body shells; mounting means for mounting the front ends of said two body shells for angular turning movement toward and away from each other; a flexible wing located between said body shells and having lateral edge portions defining an angle with each other and being respectively secured to said body shells, said wing being constructed and arranged to permit angular movement of said body shells toward and away from each other; and propulsion means in the region of the respective rear ends of said body shells for propelling said craft in a selected path.

3. A flying craft having the shape of an arrowhead, and comprising two elongated body shells having in transverse cross section endless curved peripheral outlines; mounting means for mounting the front ends of said two body shells for angular movement toward and away from each other; and a foldable wing located between said body shells and having lateral edge portions defining an angle with each other and being respectively secured to said body shells, said wing being constructed and arranged to permit angular movement of said body shells toward and away from each other, said edge portions extending tangential to said peripheral outlines at least when said bodies have moved away from each other and are farther spaced from each other.

4. A flying craft having the shape of an arrowhead, and comprising two elongated body shells having in transverse cross section endless curved peripheral outlines; mounting means for mounting the front ends of said two body shells for angular movement toward and away from each other; and a foldable wing located between said body shells and having lateral edge portions defining an angle with each other and being respectively secured to said body shells, said wing being constructed and arranged to permit angular movement of said body shells toward and away from each other, said wing having two panels, said panels having adjacent inner longitudinal edges, and lateral edge portions defining an angle with each other and extending tangential to said peripheral outlines at least when said bodies have moved away from each other and are farther spaced from each other; joint means connecting said inner edges along a central fold line; and other joint means respectively connecting said lateral edge portions with said body shells.

5. A flying craft comprising two elongated bodies having in transverse cross sections endless curved peripheral outlines; mounting means for mounting the front ends of said two bodies for angular movement toward and away from each other; and a wing located between said bodies and having lateral edge portions defining an angle with each other and being respectively secured to said bodies, said wing being constructed and arranged to permit angular movement of said bodies toward and away from each other, said edge portions extending tangential to said peripheral outlines at least when said bodies have moved away from each other and are farther spaced from each other.

6. A flying craft comprising two elongated bodies; mounting means for mounting the front ends of said two bodies for angular movement toward and away from each other; and a wing located between said bodies and having lateral edge portions defining an angle with each other and being respectively secured to said bodies, said wing being foldable about at least one fold therein located equidistant from said body shells so as to permit angular movement of said bodies toward and away from each other; and control means for moving said bodies between a closer position and a farther spaced position, said control means including expansible and contractible means having ends secured to the rear ends of said bodies, and motor means for expanding and contracting said last-mentioned means.

7. A flying craft comprising two elongated bodies; mounting means for mounting the front ends of said two bodies for angular movement toward and away from each other; a wing located between said bodies and having lateral edge portions defining an angle with each other and being respectively secured to said bodies, said wing being constructed and arranged to permit angular movement of said bodies toward and away from each other; and control means for moving said bodies between a closer position and a farther spaced position, said control means including expansible and contractible means having ends secured to the rear ends of said bodies, and motor means for expanding and contracting said last mentioned means.

8. A flying craft having the shape of an arrowhead, and comprising two elongated body shells; mounting means for mounting the front ends of said two body shells for angular movement toward and away from each other; a wing located between said body shells and having lateral edge portions defining an angle with each other and being respectively secured to said body shells, said wing being constructed and arranged to permit angular movement of said body shells toward and away from each other; and control means for moving said body shells between a closer position and a farther spaced position, said control means including means for rotating said body shells about longitudinal axes thereof.

9. A flying craft having the shape of an arrowhead, and comprising two elongated body shells; a capsule including a cockpit and located forwardly of said body shells; mounting means secured to said capsule for mounting the front ends of said two body shells for angular movement toward and away from each other, said mounting means including a pair of shafts secured to said capsule and a pair of bearing means secured to said front ends of said body shells and turnably receiving said shafts; and a wing located between said body shells and having lateral edge portions defining an angle with each other and being respectively secured to said body shells, said wing being constructed and arranged to permit angular movement of said body shells toward and away from each other.

10. A flying craft having the shape of an arrowhead, and comprising two elongated body shells; a capsule including a cockpit and located forwardly of said body shells; mounting means secured to said capsule for mounting the front ends of said two body shells for angular movement toward and away from each other, said mounting means including a pair of shafts secured to said capsule and a pair of bearing means secured to said front ends of said body shells and turnably receiving said shafts, a pair of supports supporting said shafts and being mounted in said capsule for turning movement about a pair of axes extending transverse to said shafts and longitudinally of said body shells, respectively; drive means for rotating said supports in opposite directions about said axes whereby said body shells are rotated; and a flexible wing located between said body shells and having lateral edge portions defining an angle with each other and being respectively secured to said body shells, said wing being constructed and arranged to be rolled up and let-off by said body shells when the same are rotated, and to permit angular movement of said body shells toward and away from each other.

11. A flying craft having the shape of an arrowhead, and comprising two elongated body shells; a capsule including a cockpit and located forwardly of said body shells; mounting means secured to said capsule for mounting the front ends of said two body shells for angular movement toward and away from each other, said mounting means including a pair of shafts secured to said capsule and a pair of bearing means secured to said front ends of said body shells and turnably receiving said shafts, said shafts being inclined to each other and located in a common plane inclined to horizontal and vertical planes whereby said body shells are rotated about longitudinal axes thereof when performing an angular movement about said shafts; and a wing located between said body shells and having lateral edge portions defining an angle with each other and being respectively secured to said body shells, said wing being constructed and arranged to permit angular movement of said body shells toward and away from each other.

12. A flying craft having the shape of an arrowhead, and comprising two elongated body shells; mounting means for mounting said two body shells for movement toward and away from each other and including means mounting said body shells for turning movement about longitudinal axes; and a flexible wing located between said body shells and having lateral edge portions respectively secured to said body shells, said wing being constructed and arranged to permit movement of said body shells toward and away from each other while at least said edge portions are wound upon or let-off from said body shells turning about said longitudinal axes.

13. A flying craft having the shape of an arrowhead, and comprising two elongated body shells; a capsule including a cockpit and located forwardly of said body shells; mounting means secured to said capsule for mounting the front ends of said two body shells for angular movement toward and away from each other, said mounting means including a pair of shafts secured to said capsule and a pair of bearing means secured to said front ends of said body shells and turnably receiving said shafts, and including means mounting said body shells for turning movement about longitudinal axes; a wing located between said body shells and having lateral edge portions defining an angle with each other and being respectively secured to said body shells, said wing being constructed and arranged to permit angular movement of said body shells toward and away from each other; and control means for moving said body shells between a closer position and a farther spaced position, said control means including expansible and contractible means having ends secured to the rear ends of said body shells, and motor means for expanding and contracting said last mentioned means.

14. A flying craft having the shape of an arrowhead, and comprising two elongated substantially frusto-conical forwardly tapering body shells; mounting means secured to said capsule for mounting the front ends of said two body shells for angular movement toward and away from each other, said mounting means including a pair of shafts secured to said capsule and a pair of bearing means secured to said front ends of said body shells and turnably receiving said shafts, and including means mounting said body shells for turning movement about longitudinal axes; a flexible wing located between said body shells and having lateral edge portions defining an angle with each other and being respectively secured to said body shells, said wing being constructed and arranged to permit angular movement of said body shells toward and away from each other; and control means for moving said body shells between a closer position and a farther spaced position, said control means including expansible and contractible means having ends secured to the rear ends of said body shells, and motor means for expanding and contracting said last mentioned means.

15. A flying craft having the shape of an arrowhead, and comprising two elongated cylindrical body shells having in transverse cross section endless curved peripheral outlines; a capsule including a cockpit and located forwardly of said body shells; mounting means secured to said capsule for mounting the front ends of said two body shells for angular movement toward and away from each other, said mounting means including a pair of shafts secured to said capsule and a pair of bearing means secured to said front ends of said body shells and turnably receiving said shafts, a foldable wing located between said body shells and having lateral edge portions defining an angle with each other and being respectively secured to said body shells and extending tangential to said peripheral outlines at least when said bodies have moved away from each other and are farther spaced from each other, said wing being constructed and arranged to permit angular movement of said body shells toward and away from each other; and control means for moving said body shells, between a closer position and a farther spaced position, said control means including expansible and contractible means having ends secured to the rear ends of said body shells, and motor means for expanding and contracting said last mentioned means.

16. A flying craft having the shape of an arrowhead, and comprising two elongated body shells; a capsule including a cockpit and located forwardly of said body shells; mounting means secured to said capsule for mounting the front ends of said two body shells for angular movement toward and away from each other, and including means mounting said body shells for turning movement about longitudinal axes; and a wing located between said body shells and having lateral edge portions defining an angle with each other and being respectively secured to said body shells, said wing being constructed and arranged to permit angular movement of said body shells toward and away from each other.

17. A flying aircraft having the shape of an arrowhead, and comprising two elongated body shells having in transverse cross sections endless curved peripheral outlines, and having adjacent front ends, and a wing between said body shells having lateral edge portions defining an angle with each other and being respectively secured to said body shells, said wing being arranged and constructed in such a manner as to permit angular movement of said body shells toward and away from each other, said edge portions extending tangential to said peripheral outlines at least when said body shells are farther angularly spaced from each other.

18. A flying aircraft comprising two body shells having in transverse cross sections endless curved peripheral outlines, a wing located between said body shells having lateral edge portions respectively secured to said body shells, said wing being arranged and constructed to permit movement of said body shells toward and away from each other, said edge portions extending tangentially to said peripheral outlines at least when said body shells are farther spaced from each other, and means acting on said body shells for moving the same toward and away from each other.

19. An aircraft as set forth in claim 7 wherein said wing is flexible.

20. An aircraft as set forth in claim 19 and including means for supporting at least one of said bodies for turning movement about a longitudinal axis, and means for turning said one of said bodies about said axis thereof for winding said flexible wing on said turnable body.

References Cited by the Examiner
UNITED STATES PATENTS 2,193,029 3/1940 Juul _____ 244—139
3,140,842 7/1964 Craigo _____ 244—46

OTHER REFERENCES

Space/Aeronautics (Ricles), January 1962, pages 60–63.
"Aviation Week and Space Technology," Oct. 8, 1962, page 32.

MILTON BUCHLER, *Primary Examiner.*

FERGUS S. MIDDLETON, *Examiner.*

G. P. EDGELL, B. BELKIN, *Assistant Examiners.*